United States Patent
Broder et al.

(10) Patent No.: US 8,131,726 B2
(45) Date of Patent: Mar. 6, 2012

(54) GENERIC ARCHITECTURE FOR INDEXING DOCUMENT GROUPS IN AN INVERTED TEXT INDEX

(75) Inventors: Andrei Z. Broder, Bronx, NY (US); Marcus Felipe Fontoura, Los Gatos, CA (US); Michael Herscovici, Haifa (IL); Ronny Lempel, Haifa (IL); John Ai McPherson, Jr., San Jose, CA (US); Andreas Neumann, Muelheim an der Ruhr (DE); Runping Qi, Cupertino, CA (US); Eugene Jon Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1726 days.

(21) Appl. No.: 10/905,604

(22) Filed: Jan. 12, 2005

(65) Prior Publication Data

US 2006/0155739 A1    Jul. 13, 2006

(51) Int. Cl.
*G06F 7/00* (2006.01)
*G06F 17/00* (2006.01)
*G06F 17/30* (2006.01)

(52) U.S. Cl. .................... 707/741; 707/736; 707/673
(58) Field of Classification Search .............. 707/3, 101, 707/102, 673, 736, 741
See application file for complete search history.

(56) References Cited

U.S. PATENT DOCUMENTS

| | | | |
|---|---|---|---|
| 5,913,208 A * | 6/1999 | Brown et al. | 707/3 |
| 6,138,113 A | 10/2000 | Dean et al. | 707/2 |
| 6,381,601 B1 | 4/2002 | Fujiwara et al. | 707/7 |
| 6,546,388 B1 | 4/2003 | Edlund et al. | 707/5 |
| 6,547,829 B1 | 4/2003 | Meyerzon et al. | 715/501.1 |
| 6,615,209 B1 * | 9/2003 | Gomes et al. | 707/5 |
| 6,631,369 B1 | 10/2003 | Meyerzon et al. | 707/4 |
| 6,658,423 B1 * | 12/2003 | Pugh et al. | 707/102 |
| 6,745,194 B2 | 6/2004 | Burrows | 707/101 |
| 6,757,675 B2 * | 6/2004 | Aiken et al. | 707/3 |
| 7,139,756 B2 * | 11/2006 | Cooper et al. | 707/6 |
| 2001/0020238 A1 | 9/2001 | Tsuda | 707/5 |

OTHER PUBLICATIONS

Dar-Shyang Lee et al., "Detecting duplicates among symbolically compressed images in a large document database," *Pattern Recognition Letters*, V22, 2001, pp. 545-550.
Dar-Shyang Lee et al., "Group 4 Compressed Document Matching Using Endpoints," *Proceedings of the Third IAPR Symposium on Document Analysis Systems*, Nagano, Japan, Nov. 4-6, 1998, pp. 29-38.
Neil T. Spring et al., "A Protocol—Independent Technique for Eliminating Redundant Network Traffic," *Proceedings of the ACM SIGCOMM 2000*, Aug. 2000, pp. 87-95.
Alistair Moffat et al., "Self-Indexing Inverted Files for Fast Text Retrieval," *ACM Transactions on Information Systems*, V14, N4, Oct. 1996, pp. 349-379.

* cited by examiner

*Primary Examiner* — Apu Mofiz
*Assistant Examiner* — Jared Bibbee
(74) *Attorney, Agent, or Firm* — IP Authority, LLC; Ramraj Soundararajan

(57) ABSTRACT

A method for indexing a plurality of documents, that includes a plurality of duplicate documents, first identifies one or more duplicate groups of documents from among the plurality of documents. Then, one index of content for the duplicate group is created instead of indexing the content from every document within the duplicate group. However, in contrast to the content index, an index of metadata for each of the documents in the duplicate group is created. Thus the content of each duplicate group is indexed only once, while a search engine using such indexing techniques retains the capability to answer queries as if the duplicated content was indexed for each document of the group.

26 Claims, 4 Drawing Sheets

GENERIC ARCHITECTURE FOR INDEXING DOCUMENT GROUPS IN AN INVERTED TEXT INDEX

BACKGROUND OF THE INVENTION

The present invention relates generally to the field of search engines. More specifically, the present invention is related to document indexing architectures of search engines.

DISCUSSION OF THE PRIOR ART

Detection of duplicate documents or other content is an important feature in Web search engines as well as other, similar search engines. Duplicate detection identifies duplicate documents to avoid presenting documents with the same (or very similar) content as a result to a user query. The general scheme implemented by most search engines includes annotating each document with a fingerprint during tokenization of each document. This fingerprint is conventionally computed by hashing the document's content. The duplicate detection algorithm uses these fingerprints to identify groups of documents with the same (or nearly the same) content. Documents are then annotated with their document group information as they are indexed by the search engine. During query evaluation, the engine makes sure that each result set does not contain more than one document from a same duplicate group.

The fingerprinting scheme mentioned above enables search engines to identify documents with similar content. One simplistic solution, used now, is to discard all except one of the duplicate documents and index just that one of the duplicate documents and to return that arbitrary representative document every time the group's content matches the query. However, searching Web-like collections involves more than just comparing the content of documents with queries. Often, the meta-data of the documents play an important role in determining which documents qualify as search results. Queries, for example, might explicitly specify constraints on the URL (or site) from which resulting documents are expected, on the authors of documents, on their creation dates, etc. Even when queries do not explicitly include constraints on meta-data, tokens found in the meta-data may contribute to determining which documents match the query. For example, it is customary to consider tokens found in the URL of a document as if they were found in the body of the document. Meta-data tokens and attributes of documents are not taken into account in the fingerprinting process—because, had the URL been considered while fingerprinting, it is likely that no duplicates would ever be found. Thus, a duplicate group may contain documents with very similar content but with widely varying meta-data. Thus, if a search query identifies criteria that involves meta-data, it follows that in many cases only part of a duplicate group qualifies as results of a query.

It may appear that simply indexing an "imaginary" document, containing the joint content and the union of the meta-data of all the various duplicates would address the problem. However, this approach fails since queries may also contain "negative" terms that are required not to appear in results. Indexing the union of several documents' meta-data would result in disqualifying the entire group over violating meta-data found in only one of the documents. Thus, simple approaches to handling documents with duplicated content may lead to recall issues that stem from the difference in meta-data exhibited by the documents.

There have been a variety of efforts directed towards solutions tangentially related to problems involving duplicate detection. For example, U.S. Pat. No. 5,913,208 to Brown et al., U.S. Pat. No. 6,615,209 to Gomes et al., and U.S. Pat. No. 6,658,423 to Pugh et al. relate to different techniques for identifying and detecting duplicate documents. A paper by Moffat and Zobel, entitled, "Self-Indexing Inverted Files for Fast Text Retrieval" proposes methods for compression techniques for indexes. Whatever the precise merits, features, and advantages of the above cited references, none of them achieves or fulfills the purposes of the present invention.

SUMMARY OF THE INVENTION

Accordingly, embodiments of the present invention relate to a method for indexing duplicate groups in such a way that indexes the content only once but allows queries to be answered as if the duplicated content was indexed for each document of the group.

One aspect of the present invention relates to a method for indexing a plurality of documents as, for example, by a search engine. In accordance with this aspect of the invention, one or more duplicate groups of documents are identified from among the plurality of documents. Then, the content for the duplicate group is indexed only once instead of being indexed for every document within the duplicate group. However, in contrast to the content, the metadata for each of the documents in the duplicate group is indexed. Thus, certain embodiments of the present invention relate to a mechanism for indexing duplicate groups. They permit the indexing of the duplicate content only once, while still being able to answer queries as if the duplicated content was indexed for each document of the group. Thus, recall capabilities are retained, while saving considerable amounts of index space, at negligible costs in terms of runtime performance.

Other aspects of the present invention relate to incorporating such indexing techniques within a search engine that returns a list of documents in response to a query. In particular, the list of documents may advantageously be arranged such that only a single document from a duplicate group is included in the list.

DESCRIPTION OF THE PREFERRED EMBODIMENTS

Figure 1:
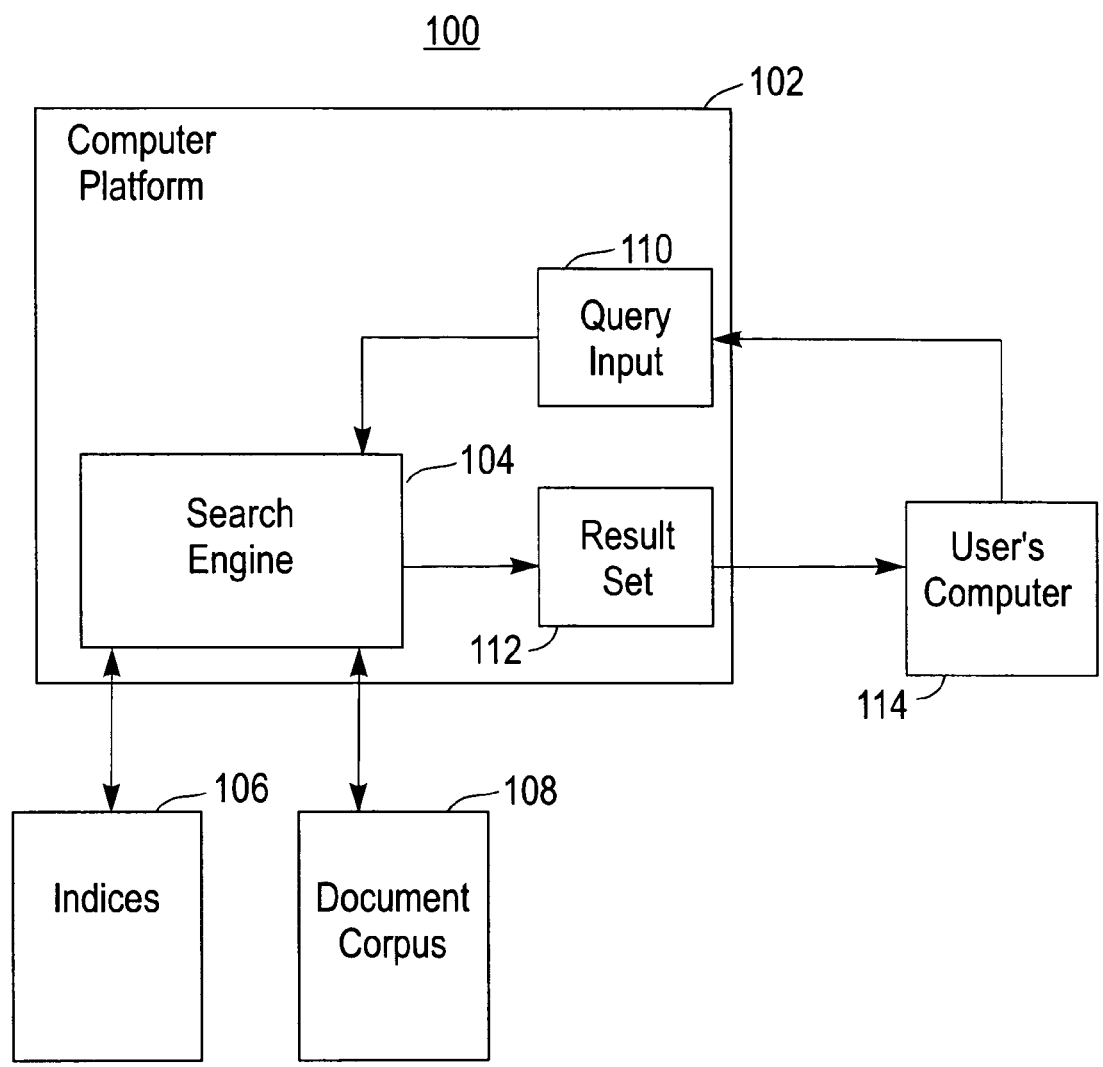
FIG. 1 illustrates a schematic view of an example computer environment for various embodiments of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Additionally, the present invention provides for an article of manufacture comprising computer readable program code contained within implementing one or more modules to index the duplicate content only once, while still being able to answer queries as if the duplicated content was indexed for each document of the group. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for indexing duplicate content only once, while still being able to answer queries as if the duplicated content was indexed for each document of the group. FIG. 1 illustrates a schematic depiction 100 of one example computer environment for various embodiments of the present invention. A computer platform 102 supports a search engine application 104. As recognized by one skilled in this art area, the computer platform 102 can be a single microprocessor or a distributed group of processors and systems. Furthermore, a general-purpose computer with appropriate software, may be used as well as a specialized, dedicated system.

Search engine application 104 includes the capability to locate a corpus of documents 106 and create one or more indexes 108 related to those documents and their respective content. As is conventionally known, one aspect of the search engine application 104 involves identifying duplicate documents within the corpus 106. The corpus 106 may be a localized database or may be a widely distributed collection of documents, such as the world wide web. As recognized by one of ordinary skill in this field, duplicate documents are ones that have substantially similar content. In some embodiments, the content may be identical but, in other embodiments, minor differences in documents may be allowed while still considering them to be duplicates.

Typically a user on a different computer 114 provides a query as input to the search engine. This computer 114 may be locally located relative to the computer platform 102 or may be connected via a network or other communications link. At computer platform 102, the query is received as input 110 to search engine 104. In response, search engine 104, locates matching documents according to the query and provides a result set 112 to the computer 114. Even though other computers are not explicitly shown in FIG. 1, a search engine application 104 may provide service to a number of different queries concurrently. Embodiments of the present invention create and manipulate the indexes 108 in such a way to index duplicate content only once, while still being able to answer queries as if the duplicated content was indexed for each document of the group. Thus, recall capabilities are retained, while saving considerable amounts of index space, at negligible costs in terms of runtime performance.

The computer 102, the documents 106, and the indices 108 can be stored in a variety of different computer-accessible memories without departing from the scope of the present invention. Both non-volatile and volatile memory can be used as well as a combination of both. The arrangement of such memory can include migration capability, caching capabilities, as well as redundant and fail-safe capabilities as is recognized by one of ordinary skill in the art.

Figure 2:
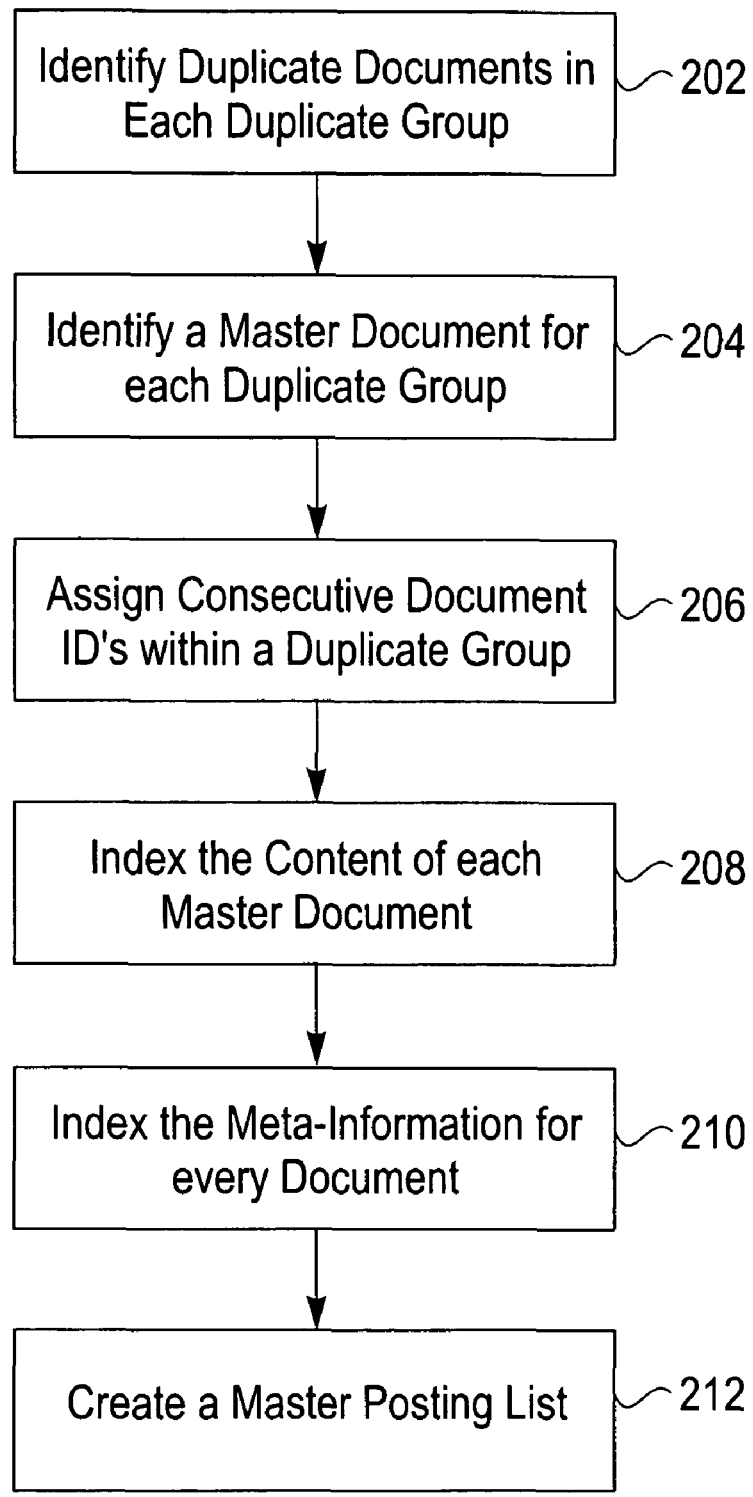
FIG. 2 illustrates a flowchart of an example algorithm for creating data structures in accordance with the principles of the present invention.

FIG. 2 depicts a flowchart of an example algorithm for creating the indexes 108 in accordance with the principles of the present invention. In step 202, the search engine 104 identifies duplicate documents within the corpus of documents 106 and separates them into document groups. Although the term "document" is used throughout the present description, this term is intended to encompass a wide variety of data sources that can include traditional text documents as well as other data such as multimedia content or mixed media data sources. As mentioned previously, a variety of current methods exist for determining duplicate documents and embodiments of the present invention may use any of these methods, or similar methods, without departing from the scope of the present invention. The search engine application 104, in step 204, then identifies a master document for each duplicate group. This master document may be picked arbitrarily from among the duplicate documents within a group or some heuristic may be used to select the master document. For example, the duplicate document having the shortest URL may be selected as the master document within a duplicate group. Alternatively, the document with the most recent date may be selected as the master document. Other heuristics may be utilized as well.

Each document within the corpus 106 is assigned a unique ID number. According to the principles of the present invention, the documents within each duplicate group are assigned consecutive ID numbers, in step 206, with the master document having the lowest ID number within a group. For example, the first duplicate group consisting of four documents would have ID numbers 1, 2, 3, 4; while the next duplicate group consisting of three documents would have ID numbers 5, 6 and 7. For these two groups, documents 1 and 5 are the respective master documents.

In step 208, the search engine indexes the content of the documents. In particular, the index created merely indexes the content of the master documents and does not index the content of each duplicate document. Thus, the resulting index is significantly smaller than if the content of every document was indexed. In contrast, in step 210, the meta-data or meta-information from every document is indexed. Although a variety of functionally similar indexing methods may be used, one advantageous method is to use a "posting list".

As is conventionally known, documents are broken down into tokens and an index is created that identifies which tokens are contained in which documents. Content tokens are typically words such as "dog", "cat", etc. Meta-data tokens, or meta-tokens, can be any of a variety of information such as document URL, document type, author, creation date, security flags, etc. A posting list is created for each token; a posting list is an ordered set of posting entries, where each entry has a position and a data field. In accordance with the principles of the present invention, there is a data field within each entry which identifies if it corresponds to a content entry or a meta-data entry. The collection of posting lists for all the tokens is generally referred to as an Inverted Text Index.

For example, one token may be "IBM". The posting list for "IBM" may resemble:

```
IBM=>
  <doc = 1, value = 0>
  <doc = 4, value = 1>
  ...
  <doc = 100, value = 0>
```

This posting list is an ordered list that will identify those documents within the corpus 106 that contain the token "IBM". The value field is used to determine whether the token was located in the content part of the document or in the meta-data part. Thus, in accordance with the principles of the present invention, the content tokens and the meta-tokens from the master documents will be in the various posting lists. However, only the meta-tokens from duplicate documents will be in the posting lists.

In step 212, the search engine creates a master posting list. This list identifies the master document for each document. One example master posting list is included below. According to this list, documents 1, 2 and 3 are duplicates as are documents 4, 5, 6 and 7.

```
Master =>
<doc=1, value =1>
<doc=2, value =1>
<doc=3, value=1>
<doc=4, value =4>
<doc=5, value=4>
<doc=6, value=4>
<doc=7, value=4>
```

With the master posting list having this arrangement, the search engine application can traverse the master posting list using different commands. For example, one routine would be to return the master document ID if given a document ID. In programmatic syntax, a procedure "getMaster" may be called by passing in an ID as a parameter. A call such as "getMaster(DocID)"would search the master posting list to identify the entry for "DocID" and return the data from the "value" field. Another useful procedure is "getNextMaster" that would identify the master document ID having a document ID greater than or equal to a particular document ID. Thus, in the example master posting list above, the command "getNextMaster(2)" would return a value of "4".

Figure 3:
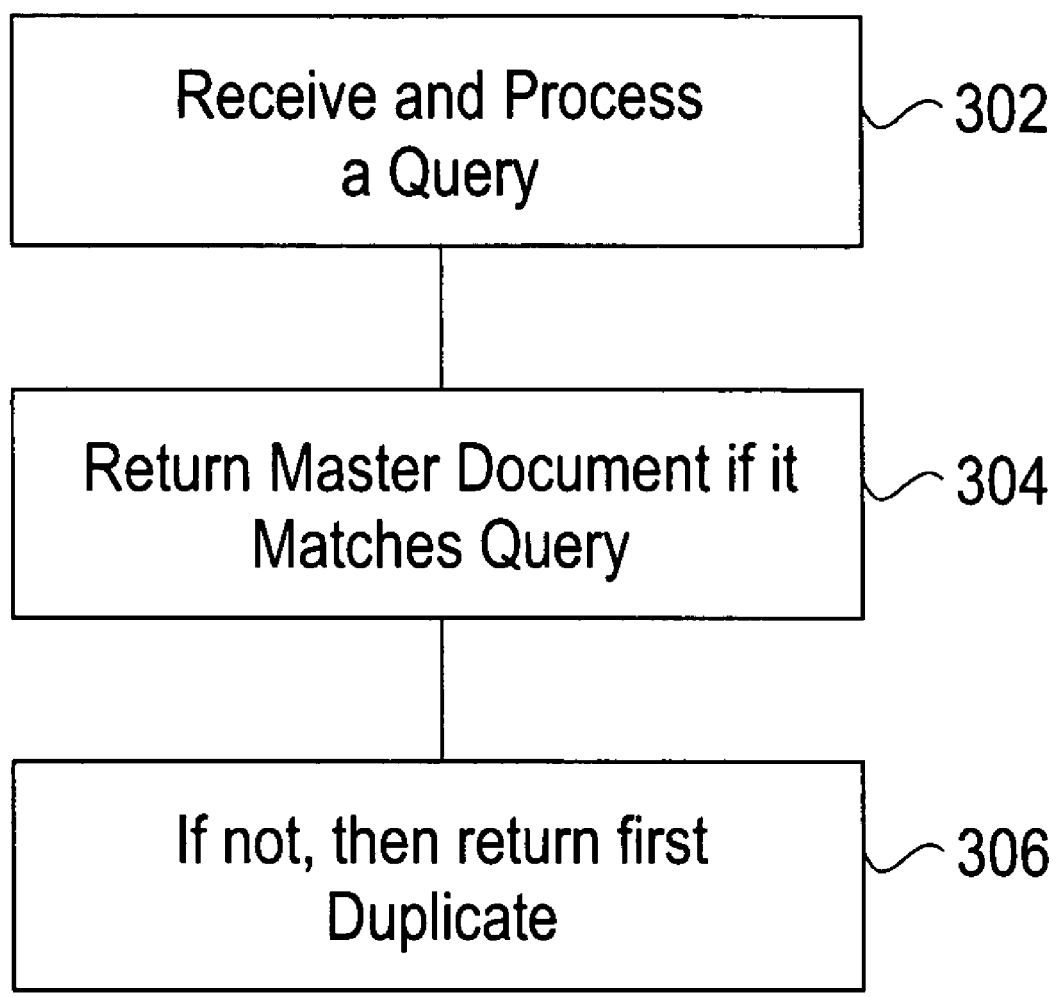
FIG. 3 illustrates a flowchart of an algorithm for executing a query in accordance with the principles of the present invention.

Once created, the posting lists are used by the search engine application to locate matching documents to a query and to return them to a user. In one advantageous embodiment of the present invention, only one document from each duplicate group is returned for a particular query. This behavior is beneficial to a user as it eliminates redundant documents within a result set. FIG. 3 depicts a flowchart of an example algorithm for handling search queries. In step 302, the search engine application receives the query and processes it. In response to the query, the search engine application returns, in step 304, any master document that satisfies the query. If for example, the query did not include criteria involving meta-data, then a matching master document would be returned.

If, however, the query criteria included meta-data, then a master document may match based on content but be disqualified based on meta-data. In such an instance, the search engine application, in step 306, would not return the master document but would return the first matching duplicate document that satisfied both the content and meta-data aspects of the query.

Figure 4:
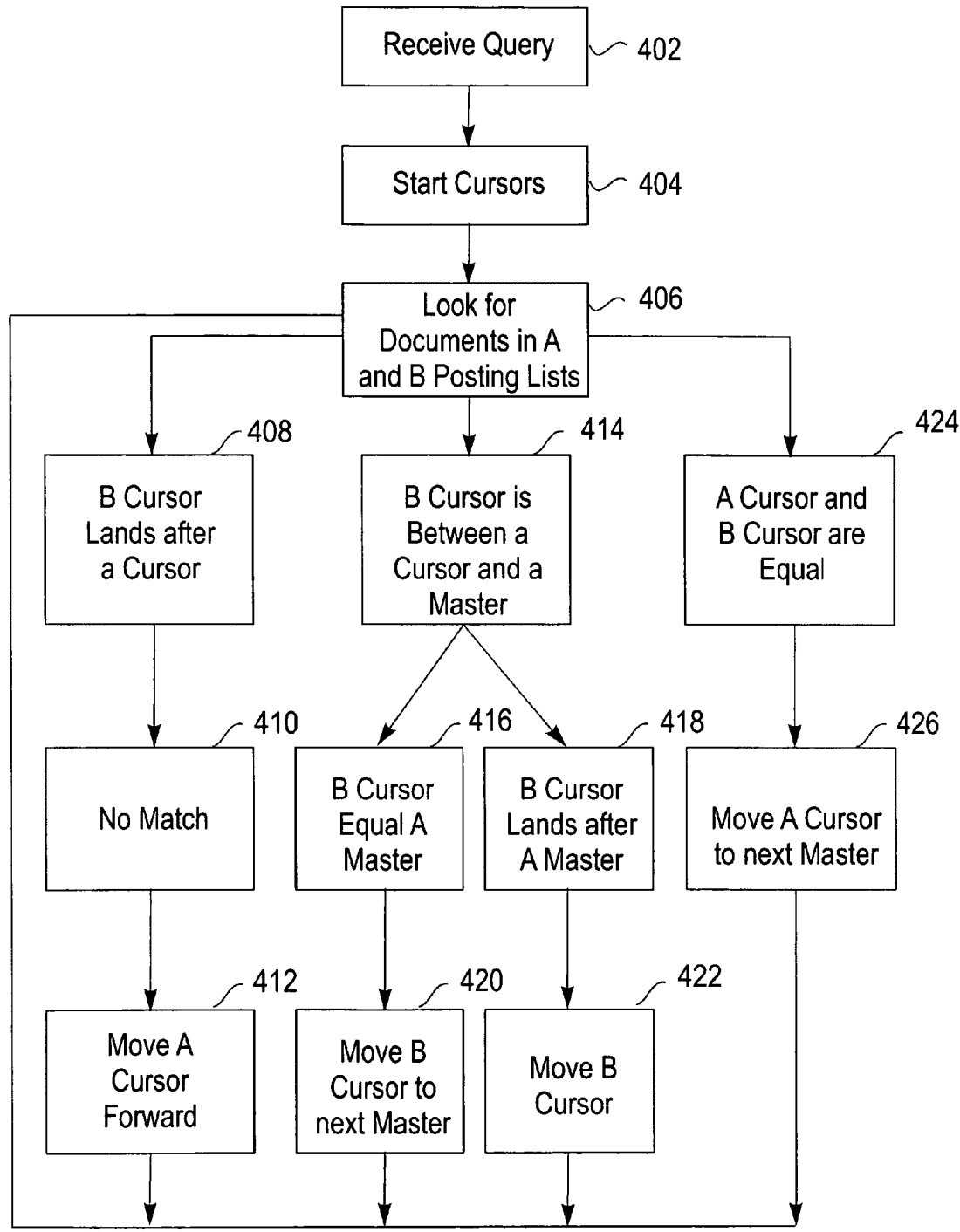
FIG. 4 illustrates a more detailed flowchart of the algorithm of FIG. 3.

FIG. 4 depicts a flowchart of a more detailed algorithm for identifying documents that match a query. So as not to obscure the operation of the flowchart in FIG. 4, the example algorithm uses a simple query including only two tokens "A" and "B"; however, this algorithm is readily expanded to queries involving more than two terms and to negative queries such as "A" but not "B". Furthermore, it should be considered that one or both of the tokens "A" and "B" may be meta-tokens so that a duplicate document within a duplicate group may match the query even if the master document for that group does not.

In step 402, a query is received that asks for documents containing "A" and "B". In response, four cursors are initiated, in step 404, which will traverse the various indices to locate matching documents. One cursor will traverse the posting list corresponding to the token "A" while another cursor will traverse the posting list corresponding to the token "B". Two additional cursors will traverse the master posting list. During its traversal, the A cursor will point to the entry in the A posting list for the next matching document. Concurrently, one cursor of the master posting list (which can be called "A's master") will be moved to point to the master document corresponding to that matching document being pointed to by the A cursor. The other cursor of the master posting list plays a similar role as "B's master". Every time a cursor is moved in A and B, the corresponding master cursor is repositioned as well. This can be easily accomplished using the "getMaster" routine described earlier. Intuitively, when the A cursor and the B cursor point to the same document, then that document matches the query.

Thus, in step 406, the query will execute by searching through the "A" posting list for the entry corresponding to the first matching document (i.e., the document contain the token "A"). The cursor in the "B" posting list will also be moved to its first matching document. There are three possible outcomes. In step 408, the B cursor may land on a document after the document pointed to by the A cursor. In this instance, the search engine application determines, in step 410, that there is no match and moves the A cursor to the next matching document in step 412. Further searching proceeds from there.

If the search engine determines in step 414 that the B cursor points to a document between A's master document and the A cursor, then two possible scenarios are considered. In step 416, it is determined that the B cursor lands at A's master document. In this instance, there is a matching document (the document pointed to be the A cursor) which is returned. In step 420, the B cursor is moved using the "getNextMaster" command so as to avoid duplicate documents in the result set. That is, the B cursor starts looking for the next matching document in the B posting list that has a document ID equal to or higher than the value returned by the "getNextMaster" procedure call. Further searching continues from here.

The alternative outcome is that in step 418, it is determined that the B cursor lands after A's master document. In this instance, there is no matching document yet. Thus, in step 422, the search engine application moves the B cursor forward so that further searching may continue.

The final possibility is that the B cursor lands on the document pointed to by A, as shown by box 424 of the flowchart. In this instance, there is a matching document to be returned in the result set. In step 426, the A cursor is moved to the next master document entry in the A posting list to continue searching for the next matching document from this point. This will prevent duplicate documents from being included in the result set. A similar result can be accomplished by moving the B cursor instead of the A cursor. In either case, the "getNextMaster" command, described earlier can be used.

Another characteristic of current search engines is that they typically return just one document whenever several documents with duplicate content match the query by simply discarding all information about the duplicate documents. Thus conventional search engines do not support scenarios where one might prefer all the matching documents to be returned (or counted), regardless of some documents having the same content. Note that this does not necessarily mean returning entire duplicate groups (that would be simplistic)—the query may have constraints (e.g., on creation date) that are respected only by a subset of the group. And so, while the engine should have the ability to return several duplicate documents, it should still only index duplicate content once. As can be appreciated, in addition to the detailed example embodiment in which only a single document from a group is returned, other embodiments of the present invention provide the search engine the capability to return information about several duplicate documents that match a query criteria but only requires indexing the duplicate content once.

CONCLUSION

A system and method has been shown in the above embodiments for the effective implementation of a Generic Architecture for Indexing Document Groups in an Inverted Text Index. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of search engine programming.

What is claimed is:

1. A method for indexing a plurality of documents, the method comprising the steps of:
   a) identifying a duplicate group of documents from among the plurality of documents, each of the documents in the duplicate group comprising respective content and metadata, wherein the respective content of each document in the duplicate group is substantially similar and corresponds to a content for the duplicate group;
   b) creating one index of content for the duplicate group;
   c) indexing the metadata for each of the documents in the duplicate group;
   d) receiving a query and executing said query as if duplicated content was indexed for each document of the duplicate group, and
   e) outputting results of said query.

2. The method of claim 1, wherein the step of creating one index includes the steps of:
   identifying a master document from the documents in the duplicate group; and
   indexing the content of the master document but not indexing the content of other documents in the duplicate group.

3. The method of claim 1, further comprising the step of: repeating steps a), b), and c) for multiple duplicate groups of documents.

4. The method of claim 3, further comprising the steps of:
   for each duplicate group of documents, identifying a respective master document; and
   associating with each of the plurality of documents, its respective master document.

5. The method of claim 4, wherein the step of associating includes the steps of:
   creating a master posting list comprised of a plurality of entries corresponding to each of the plurality of documents, wherein each entry comprises a first identifier for a document and a second identifier for its associated master document.

6. The method of claim 5, wherein the respective first identifiers for documents of a duplicate group are consecutively ordered.

7. The method of claim 5, wherein the first identifier and second identifier for a master document are equal.

8. The method of claim 5, wherein the first identifier of a master document in a particular duplicate group is less than the respective first identifiers of other documents of that particular duplicate group.

9. The method of claim 1, wherein the step of outputting results comprises the step of returning a result set of matching documents.

10. The method of claim 9, wherein the result set includes not more than one document from the duplicate group.

11. The method of claim 9, further comprising the steps of:
    determining if a master document of the duplicate group includes matching metadata and content based on the query; and
    if so, returning the master document in the result set.

12. The method of claim 11, further comprising the steps of:
    if the master document of the duplicate group includes metadata that does not match the query, then determining if another document in the duplicate group includes matching metadata; and
    if so, returning the other document in the result set.

13. The method of claim 9, wherein the result set comprises a list of data sources output from a search engine.

14. The method of claim 13, wherein the data sources are web pages.

15. The method of claim 1, wherein the metadata comprises one or more of a Uniform Resource Locator (URL), a document rank, security flags, an author, a creation time, a modification time, and a document type.

16. An apparatus for indexing a plurality of documents, the apparatus comprising:
    at least one processor;
    a memory coupled with the at least one processor;
    a plurality of documents stored within said memory, each document including respective content and metadata; and
    a program code residing in the memory and executed by the at least one processor, the program code configured to:
    a) identify a duplicate group of documents from among the plurality of documents, wherein the respective content of each document in the duplicate group is substantially similar and corresponds to a content for the duplicate group;
    b) create one index of content for the duplicate group;
    c) index the metadata for each of the documents in the duplicate group;
    d) store the created indices in the memory;
    e) receive and execute a query as if duplicated content was indexed for each document of the duplicate group; and
    f) output results of said query.

17. The apparatus of claim 16, wherein the program code is further configured to:
    identify a master document from the documents in the duplicate group; and index the content of the master document but not index the content of other documents in the duplicate group.

18. The apparatus of claim 16, wherein the program code is further configured to:

repeat steps a), b), c) and d) for multiple duplicate groups of documents.

19. The apparatus of claim 18, wherein the program code is further configured to:

for each duplicate group of documents, identify a respective master document;

associate with each of the plurality of documents, its respective master document; and create, in the memory, a master posting list comprised of a plurality of entries corresponding to each of the plurality of documents, wherein each entry comprises a first identifier for a document and a second identifier for its associated master document.

20. The apparatus of claim 19, wherein the respective first identifiers for documents of a duplicate group are consecutively ordered and wherein the first identifier of a master document in a particular duplicate group is less than the respective first identifiers of other documents of that particular duplicate group.

21. The apparatus of claim 16, wherein the program code is further configured to return a result set of matching documents as said output.

22. The apparatus of claim 21, wherein the result set includes not more than one document from the duplicate group.

23. A program product comprising a computer storage medium having computer readable program code embodied therein which implements indexing of a plurality of documents, each document including respective content and metadata, said medium comprising:

a) computer readable program code indentifying a duplicate group of documents from among the plurality of documents, wherein the respective content of each of the documents in the duplicate group are substantially similar and corresponds to a content for the duplicate group;

b) computer readable program code creating one index of content for the duplicate group;

c) computer readable program code indexing the metadata for each of the documents in the duplicate group;

d) computer readable program code aiding in receiving a query and executing said query as if duplicated content was indexed for each document of the duplicate group, and e) computer readable program code outputting results of said query.

24. The program product of claim 23, wherein the program code is further configured to:

identify a master document from the documents in the duplicate group; and index the content of the master document but not index the content of other documents in the duplicate group.

25. The program product of claim 23, wherein the program code is further configured to return a result set of matching documents as said output.

26. The program product of claim 23, wherein the result set includes not more than one document from the duplicate group.

* * * * *